United States Patent
Chen (10) Patent No.: US 7,234,557 B2
(45) Date of Patent: Jun. 26, 2007

(54) ELECTRIC VEHICLE WITH PARTITIONABLE STRUCTURE

(76) Inventor: Yung Cheng Chen, No. 7, Lane 398, Hung Chang 12th St., Chung Shan Li, Tao Yuan City (TW)

( * ) Notice: Subject to any disclaimer, the term of this patent is extended or adjusted under 35 U.S.C. 154(b) by 226 days.

(21) Appl. No.: 11/035,448

(22) Filed: Jan. 14, 2005

(65) Prior Publication Data
US 2006/0086553 A1 Apr. 27, 2006

(30) Foreign Application Priority Data
Oct. 26, 2004 (TW) .............................. 93216989 U (51) Int. Cl.
*B62D 61/00* (2006.01)

(52) U.S. Cl. ...................... 180/208; 180/211; 180/216; 280/638

(58) Field of Classification Search ................ 180/208, 180/215–216, 311; 280/281.1, 287, 638, 280/643, 35, 648, 274, 278, 1.188, 7.17, 280/30; 403/322.4, 325
See application file for complete search history.

(56) References Cited

U.S. PATENT DOCUMENTS

| 5,020,624 | A | * | 6/1991 | Nesterick et al. | ........... 180/210 |
| 5,695,021 | A | * | 12/1997 | Schaffner et al. | ........... 180/208 |
| 6,793,248 | B1 | * | 9/2004 | Sung | .......................... 280/781 |

* cited by examiner

*Primary Examiner*—Lesley D. Morris
*Assistant Examiner*—Maurice Williams
(74) *Attorney, Agent, or Firm*—Egbert Law Offices (57) ABSTRACT

An electric vehicle with partitionable frame includes a chassis assembly, a head tube, a front wheel, left and right rear wheels, and a seat. The front wheel is assembled at the base of the head tube through a fork, and the bottom part of the head tube is pivoted and located in the shaft sleeve lying on the front end of the oblique bracket. The seat is assembled on a vertical seat tube lying on the rear section of the chassis assembly. The chassis assembly includes front and rear assemblies that are partitionable. Connecting ends of the two assemblies are set with at least two groups of opposite jacks and opposite punch pins, which appear to be horizontally opposite and mutually embedded and mounted when assemblies are aligned. At least one set of positioning pieces controls the fixed or partitioned state of the two assemblies after they are aligned.

4 Claims, 9 Drawing Sheets

ELECTRIC VEHICLE WITH PARTITIONABLE STRUCTURE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to an electric vehicle, and more particularly to an electric vehicle with partitionable front and rear parts.

BACKGROUND OF THE INVENTION

It has been noted that, the body of existing electric vehicles is usually designed to be an integrated part. The frame of an electric vehicle is generally broader than that of an electric scooter, and the heights of its front and rear are quite different. Therefore, as to the manufacturers, these features really cause space waste during the process of storing and conveying vehicles, consequently bring about the increase in cost, and really do not satisfy the requirement of better economic value.

In the light of this, the inventor, based on the experiences of designing and developing related products for many years, aimed at the above objective, and after detailed design and cautious evaluation, ultimately obtained an invention of real practicability.

BRIEF SUMMARY OF THE INVENTION

The facts of improving functionality and effectiveness by this invention follow.

Mainly through such improved design, the body of the electric vehicles can be partitionable into front and rear parts, and this design reduces the volume, largely decreases the storage and conveys cost inside this industry, and more agrees with the industrial utilization.

The positioning piece on the connecting parts of the front and rear chassis assembly is composed of a ⌐-shaped base, a swivel-type locking plate, a tommy bar, an elastic pressing component and a projecting block, which have the advantages of resulting in simple and easy operations.

With the structural design of the dolly block which is formed when the connecting part of rear chassis assembly is added with an oblique supporting rod that cooperates with the vertical seat tube lying on the rear chassis assembly, the joint between the front and rear chassis assemblies can be reinforced and the flatness after their joint can be adjusted within a tiny scope.

With the design of a locking device of the head tube, which is installed between the oblique bracket and front wheel fork, the head tube can be locked and then avoid deflecting during the assembly process of the front and the rear chassis assemblies, making the embedding of the punch pins into the jacks smoothly performed.

With the rotating and positioning structure at the bottom of the seat, the seat can swivel and be positioned, which enables the users to get down easily. Refer to FIGS. 10, 11, 12 and 13, when the users want to get down from the vehicle, they can swivel the saddle 40 outward (as in FIG. 12) by just simply pulling the control lever 44.

The above is the detailed description of the technical characteristics of this invention based on the instance that is implemented quite well. However, experts familiar with this technique are allowed to change and modify this invention as long as they do not depart from the spirit and principle of this invention. Any change and modification may still be confined to the following scope defined by the present patent.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 9:
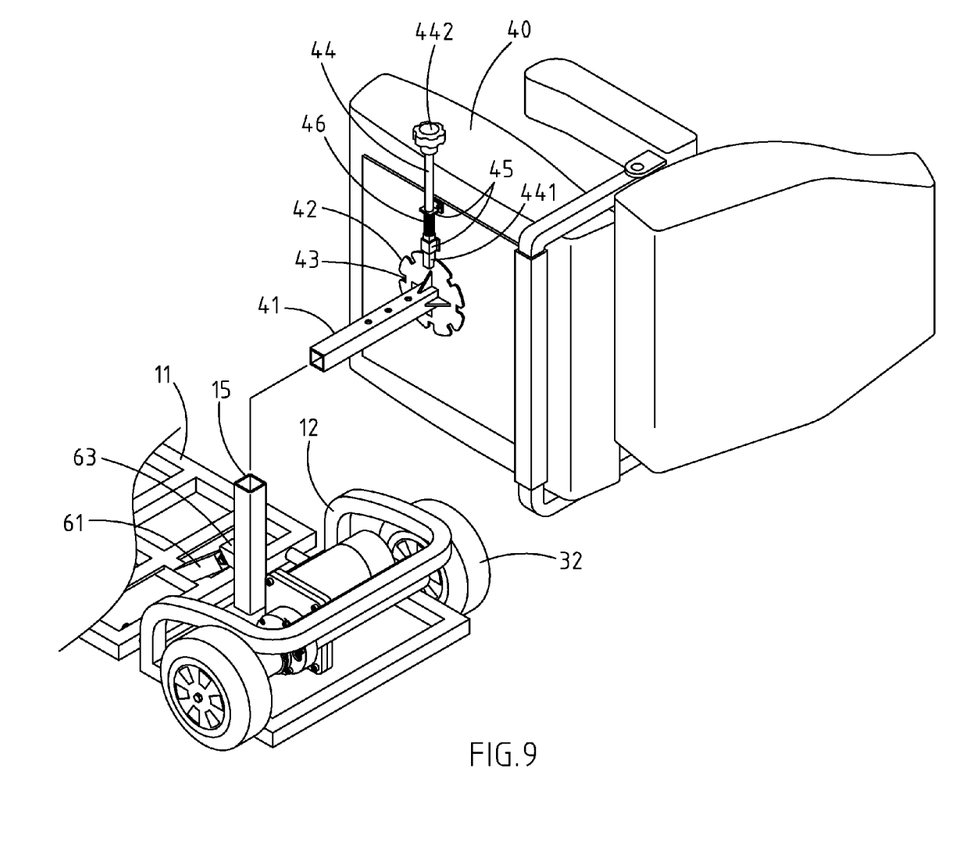
FIG. 9 shows a partial perspective view of the rotating and positioning structure of the seat.
Figure 10:
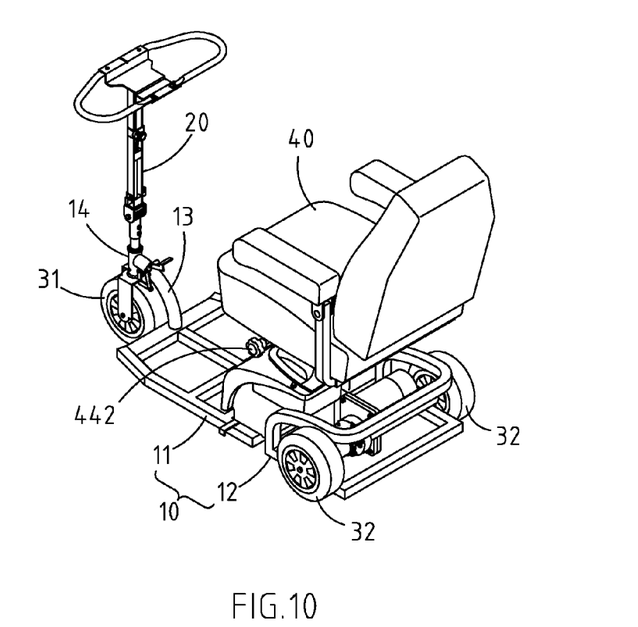
FIG. 10 shows a perspective view of the seat in use.

As shown in FIGS. 1-4, an electric vehicle with partitionable frame embodied in the present invention comprises a chassis assembly 10, a head tube 20, a front wheel 31, left and right rear wheels 32, and a saddle 40 (as shown in FIG. 9). Among these, the front wheel 31 is installed on the bottom of the head tube 20 through a fork. And the bottom part of the head tube 20 is pivoted to be located in a shaft sleeve 14 lying on the front end of an oblique bracket 13, which is installed on the front end of the chassis assembly 10. The saddle 40 is assembled, through a vertical rod 41, on a vertical seat tube 15 that lies on the rear section of the chassis assembly 10.

The chassis assembly 10 is composed of the front and the rear chassis assemblies 11 12 that are partitionable. The connecting ends of the two assemblies are set with at least two groups of opposite jacks 113 and opposite punch pins 123 which appear to be horizontally opposite and mutually embedded and mounted when the front and rear chassis assemblies 11 12 are aligned together. Moreover, the front and rear chassis assemblies 11 12 need at least one set of positioning piece to control the fixed or the partitioned state, after their connecting ends are aligned together. Therein, the positioning piece near the connecting ends of the front and rear chassis assemblies 11 12 include the following components.

There is a ⊔-shaped base 51, which is set in a projecting state and in the middle of the connecting end of the front chassis assembly 11. The top of the projecting end of the ⊔-shaped base is set with the positioning notched margin 52.

The invention also includes a swivel type of locking plate 53 on the ⊔-shaped base 51, with a front end installed on the front end of the ⊔-shaped base 51 through a pivot, and a back end swiveled. There are, on both sides of this end, projecting portions which can be locked into the positioning notched margin 52 of the ⊔-shaped base 51. Furthermore, the bottom side of this swivel end is designed with hooks 55.

There is a tommy bar 56 (designed to be like a U-shape lever in this implemented instance), which is set with projecting on the top of the locking plate 53 and can be turned by hand.

There is also an elastic pressing component 57, which can be a torsional spring and can be used to press the locking plate 53 with elasticity, such that the swivel end of the locking plate appears to be in the state of being elastically pressed down.

The invention further includes a projecting block 58 in the middle of the rear chassis assembly 12, which can just be inserted into the ⊔-shaped base 51 and then be locked together with the hooks 55 that is on the swivel end of the locking plate 53, enabling the assembly of the front and rear chassis assemblies 11 12 to be fixed.

Therein, the front chassis assembly 11 can be added with an oblique supporting rod 61 that appears at an oblique upward angle toward the rear chassis assembly 12. The top of the rod 61 is designed with an adjustable bolt 62. The front side of the vertical seat tube 15 on the rear chassis assembly 11 is correspondingly shaped into a horizontally stretching dolly block 63. The front end of the dolly block 63 fits to form a bevel surface 64, which happens to lean against the adjustable bolt 62 on the top of the oblique supporting rod 61. In this way, the joint of the front and rear chassis assemblies 11 12 can be reinforced and, at the same time, the flatness after their joint can be adjusted within a tiny scope through the adjustable bolt 62.

Figure 1:
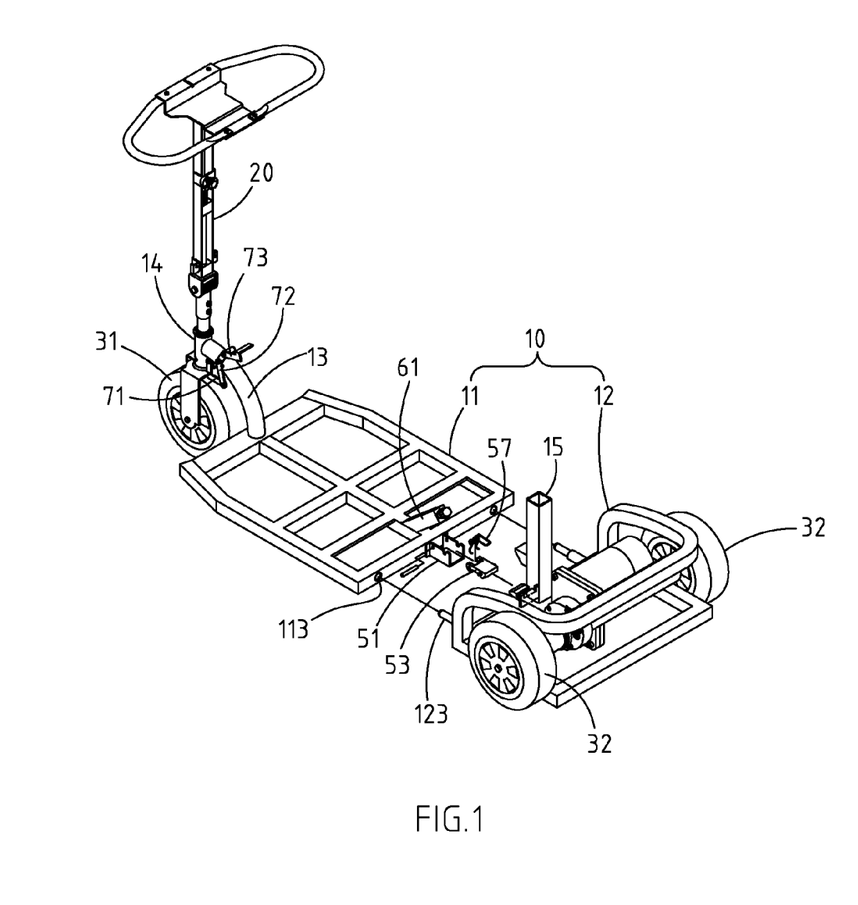
FIG. 1 shows an exploded perspective view of the present invention.
Figure 2:
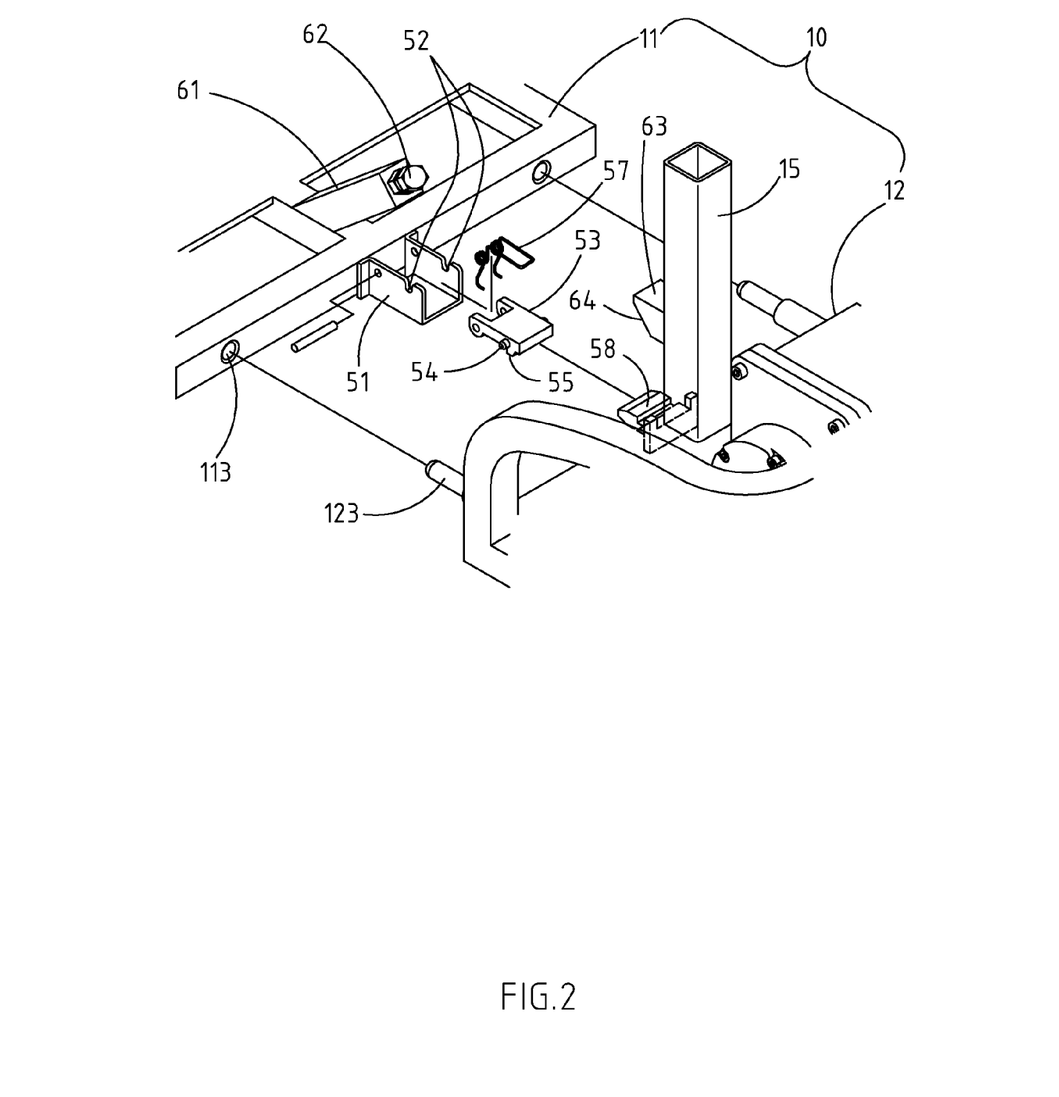
FIG. 2 shows a partial magnified perspective view of FIG. 1.
Figure 3:
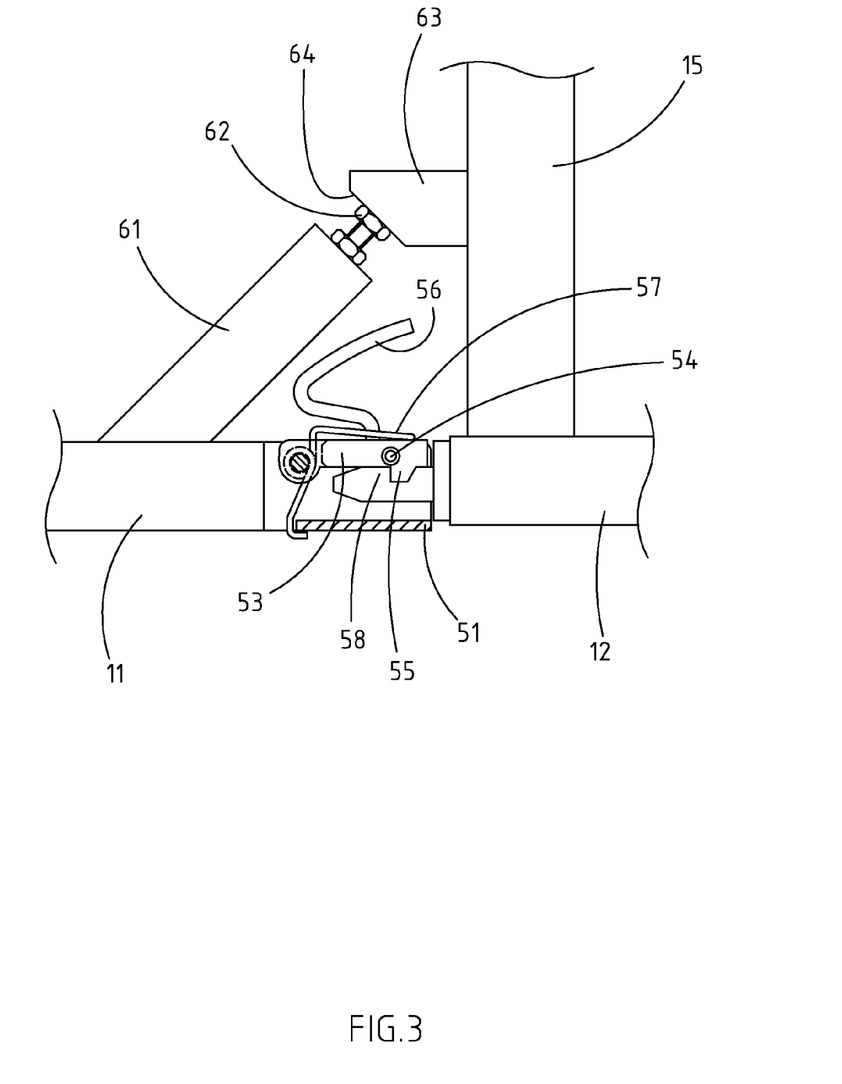
FIG. 3 shows a side elevation view of the front and rear chassis assemblies.
Figure 4:
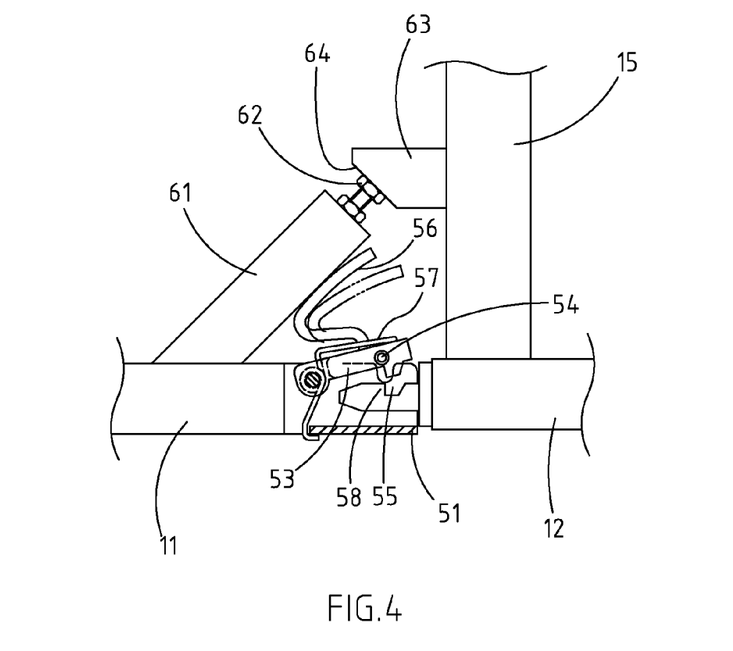
FIG. 4 shows another side elevation view of the partitioning process of the front and rear chassis assemblies.
Figure 5:
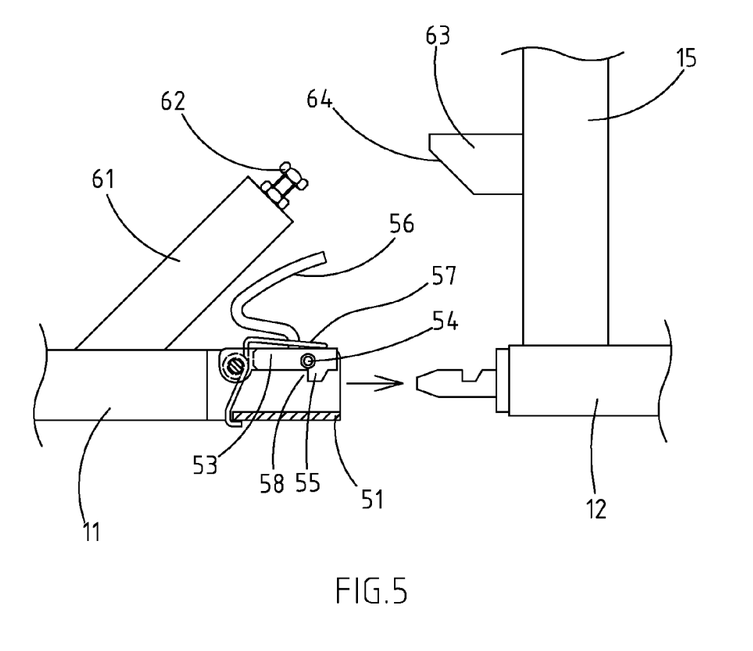
FIG. 5 shows still another side elevation view as in FIG. 4 to show the partitioning process of the front and rear chassis assemblies.
Figure 6:
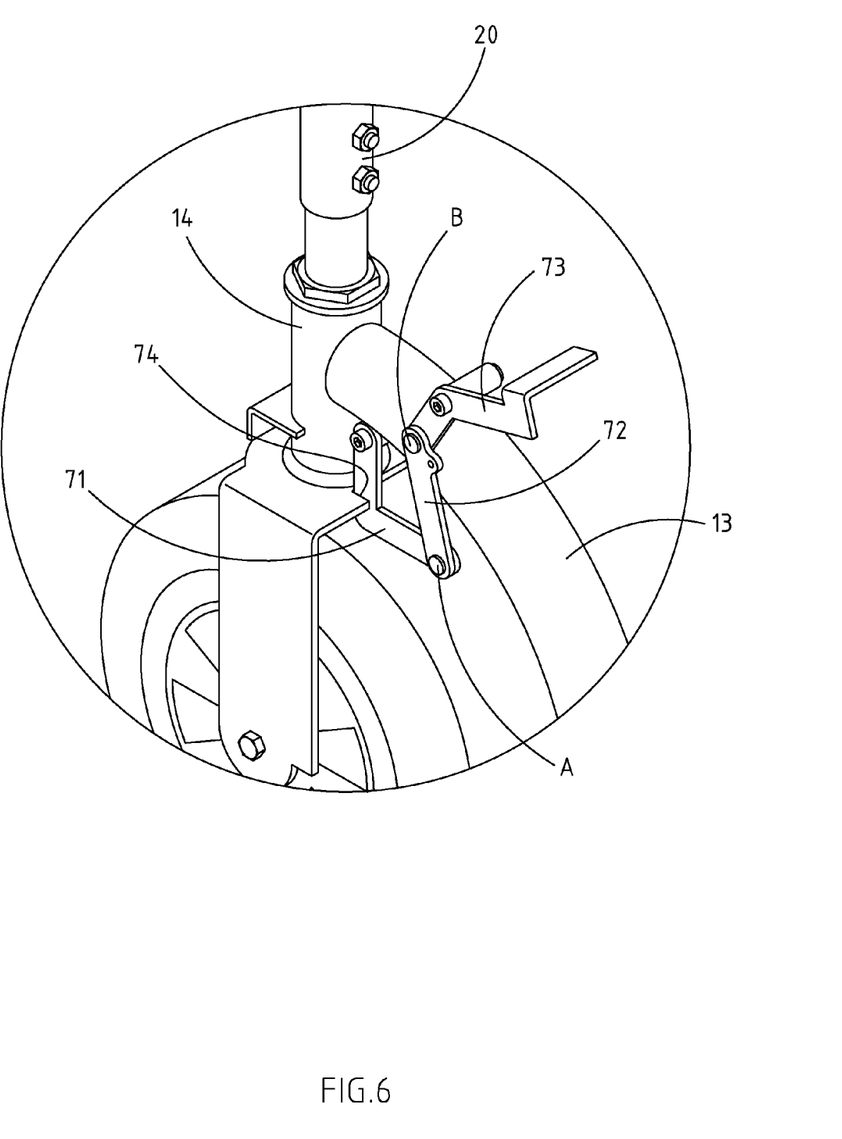
FIG. 6 shows a partial perspective view of the head tube in locking position.
Figure 7:
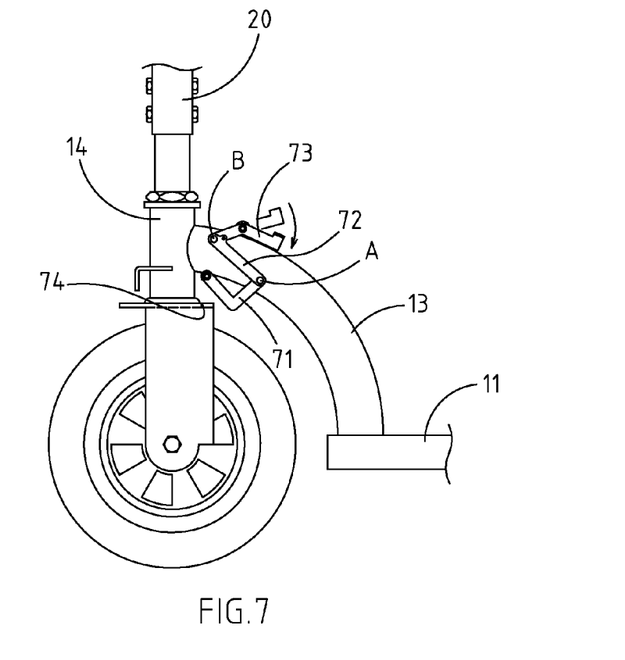
FIG. 7 shows a side elevation view of the head tube in released position.
Figure 8:
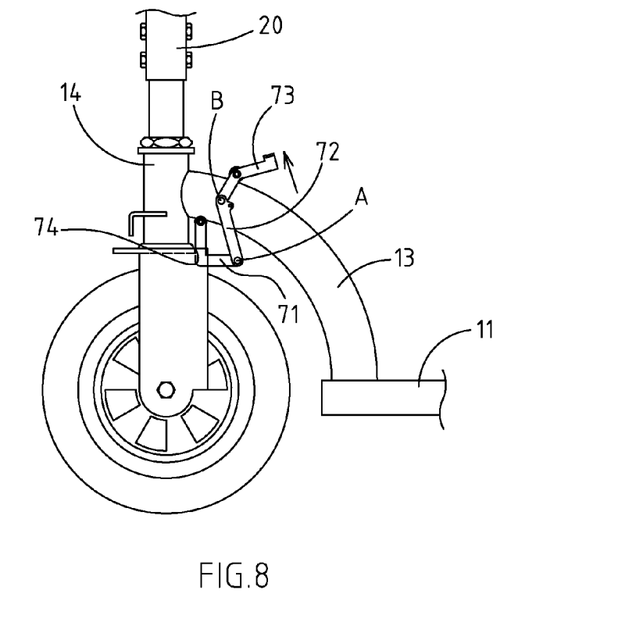
FIG. 8 shows another side elevation view of the head tube in fastened position.

Therein, a locking device of the head tube can be installed between the oblique bracket 13 and the front wheel fork 33. Such a device can be a mechanism of a connecting rod, which is composed of an L-shape bracing bar 71, an intermediate connecting rod 72 and a curved balancing bar 73. These three are in the state of movable articulated points A B. The bottom of the L-shape bracing bar 71 is fixed and pivoted in the gap, parallel to the above fork 33, of the bottom of the oblique bracket 13; the middle of the curved balancing bar 73 is fixed and pivoted on the top side of the oblique bracket 13. The fork 33 is designed with a groove 74. Then, the L-shape bracing bar 71 can be controlled to be in the state of being jammed into the groove 74 through swinging up and down the top of the curved balancing bar 73 (as shown in FIG. 8), and then the head tube 20 is locked. The head tube 20 will restore to be movable when the bar 71 is detached from the groove 74.

Figure 11:
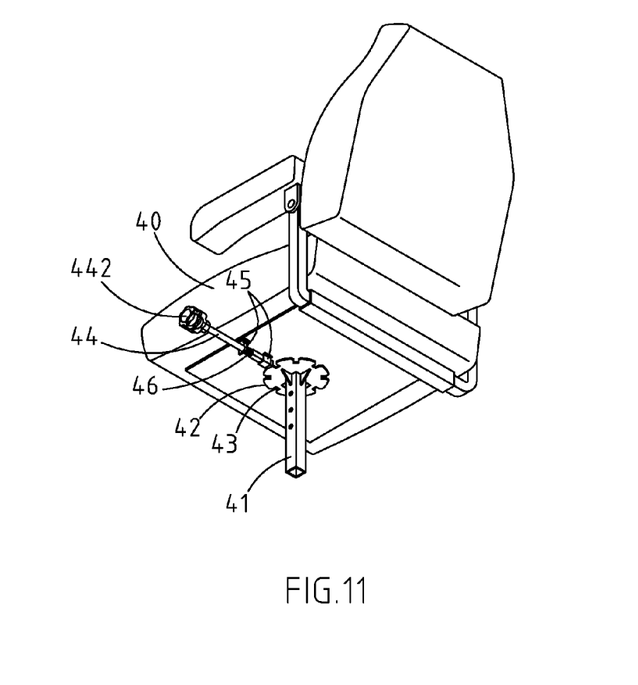
FIG. 11 shows a bottom perspective view of the positioning state of the seat in FIG. 10.
Figure 12:
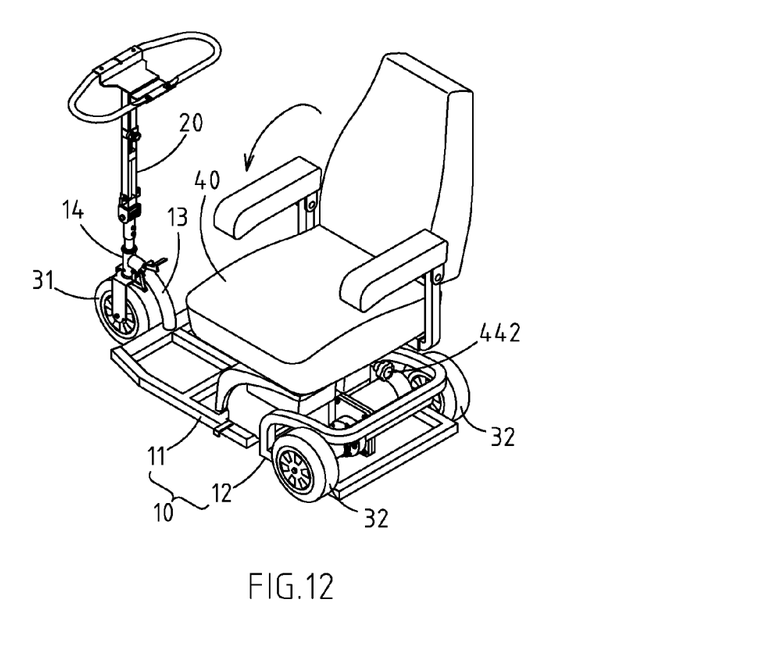
FIG. 12 shows a perspective view of seat in rotating state.
Figure 13:
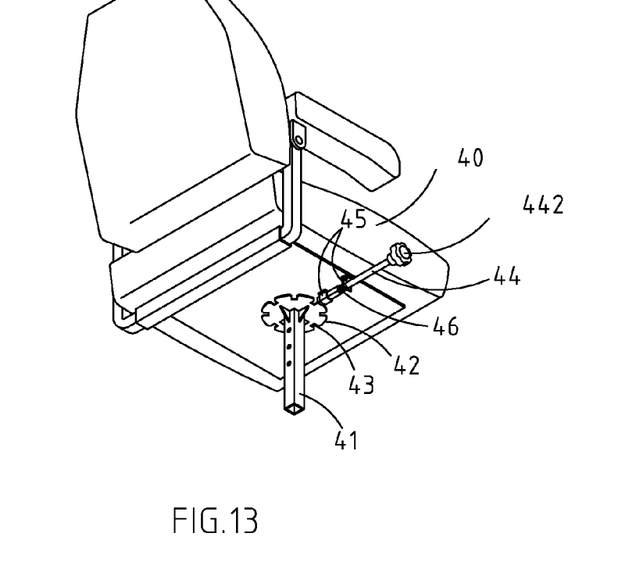
FIG. 13 shows a bottom perspective view of the rotational positioning state of the seat in FIG. 12.

As shown in FIG. 9, the bottom of the saddle 40 can be additionally installed with a rotating and positioning structure, which enables the saddle 40 to be pivoted with the vertical rod 41 and to swivel. Then a scale circle 42 is set on the top of the vertical rod 41 and there are positioning notched margins 43 with spaces distributed around the periphery of the circle. The bottom of the saddle 40 is installed with a control lever 44 which is fixed by the seat base 45 and then shifts forward and backward along an axis. The shape of the interior 441 of the control lever 44 just can be jammed into the positioning notched margins 43 of the above circle 42, and therefore, the saddle 40 will be positioned. The outer of control lever 44 projects outside the saddle 40, and is designed with a knob 442 for the users to hold and control. A group of springs is installed between the control lever 44 and the seat base 45, such that the saddle 40 can be fixed when the control lever 44 shifts inward, and be released when the lever 44 is pulled outward (as shown in FIG. 11).

I claim:

1. A partitionable frame for an electric vehicle comprising:
    a front chassis assembly having an oblique bracket at a front end thereof, said oblique bracket having a shaft sleeve at a front thereof;
    a rear chassis assembly releasably connected to said front chassis assembly, said front and rear chassis assemblies being connected together by a pair of jacks arranged horizontally opposite a pair of punch pins, said pair of punch pins being respectively embedded in said pair of jacks when said front chassis assembly is aligned with and connected to said rear chassis assembly;
    a positioning means cooperative with said pair of punch pins and said pair of jacks for selectively releasing said front chassis assembly from said rear chassis assembly;
    a head tube having a bottom pivotably received in said shaft sleeve;
    a front wheel connected by a fork to a bottom of said head tube;
    a vertical seat tube extending upwardly from said rear chassis assembly;
    a seat mounted upon an vertical rod, said vertical rod received by said seat tube;
    a U-shaped base extending rearwardly from a middle of a rear end of said front chassis assembly, said U-shaped base having a notch formed in a top edge thereof;
    a swivelable locking plate mounted on said U-shaped base, said locking plate having a front end pivotably connected adjacent a front of said U-shaped base such that a back end of said locking plate can move between an open position and a closed position, said back end of said locking plate having a projecting portion received into said notch when said locking plate is in said closed position, said locking plate having a plurality of hooks affixed to an underside thereof;
    a tommy bar projected from a top of said locking plate;
    a spring attached to said locking plate so as to urge said locking plate toward said closed position; and
    a projecting block extending from a middle of a front of said rear chassis assembly, said projecting block received in said U-shaped base, said plurality of hooks engaging a surface of said projecting block so as to fix said projecting block within said U-shaped base.

2. A partitionable frame for an electric vehicle comprising:

a front chassis assembly having an oblique bracket at a front end thereof, said oblique bracket having a shaft sleeve at a front thereof;

a rear chassis assembly releasably connected to said front chassis assembly, said front and rear chassis assemblies being connected together by a pair of jacks arranged horizontally opposite a pair of punch pins, said pair of punch pins being respectively embedded in said pair of jacks when said front chassis assembly is aligned with and connected to said rear chassis assembly;

a positioning means cooperative with said pair of punch pins and said pair of jacks for selectively releasing said front chassis assembly from said rear chassis assembly;

a head tube having a bottom pivotably received in said shaft sleeve;

a front wheel connected by a fork to a bottom of said head tube;

a vertical seat tube extending upwardly from said rear chassis assembly;

a seat mounted upon an vertical rod, said vertical rod received by said seat tube; and a support rod affixed to said front chassis assembly and extending at an oblique angle toward said rear chassis assembly, said support rod having an adjustable bolt at a top end thereof, said vertical seat tube having a dolly block horizontally extending therefrom, said dolly block having a bevel surface at a front end thereof, said bevel surface leaning against said adjustable bolt.

3. A partitionable frame for an electric vehicle comprising:

a front chassis assembly having an oblique bracket at a front end thereof, said oblique bracket having a shaft sleeve at a front thereof;

a rear chassis assembly releasably connected to said front chassis assembly, said front and rear chassis assemblies being connected together by a pair of jacks arranged horizontally opposite a pair of punch pins, said pair of punch pins being respectively embedded in said pair of jacks when said front chassis assembly is aligned with and connected to said rear chassis assembly;

a positioning means cooperative with said pair of punch pins and said pair of jacks for selectively releasing said front chassis assembly from said rear chassis assembly;

a head tube having a bottom pivotably received in said shaft sleeve;

a front wheel connected by a fork to a bottom of said head tube;

a vertical seat tube extending upwardly from said rear chassis assembly;

a seat mounted upon an vertical rod, said vertical rod received by said seat tube; and locking device affixed to said head tube and installed between said oblique bracket and said fork, said locking device comprising:

an L-shaped bracing bar;

an intermediate connecting rod; and a curved balancing bar, said L-shaped bracing bar having a bottom pivotably mounted in a gap parallel to said fork at a bottom of said oblique bracket, said curved balancing bar having a middle pivotably mounted to a top side of said oblique bracket, said fork having a groove therein, said L-shaped bracing bar swingable so as to be moveable into said groove of said fork so as to lock said head tube, said L-shaped bracing bar being releasable from said groove so as to allow said head tube to be unlocked.

4. The partitionable frame of claim 3, said seat having a rotating and positioning structure at a bottom thereof so as to allow said seat to swivel and pivot with respect to said vertical rod, said vertical rod having a scale circle at a top thereof, said rotating and positioning structure having a control lever at a bottom of said seat, said control lever shiftable forwardly and backwardly along an axis, said control lever engageable with one of said notches, said control level having an end projecting outwardly beyond a periphery of said seat, said end of said control lever having a knob mounted thereon, said rotating and positioning structure having a plurality of springs extending between said control lever and said bottom of said seat so as to urge said control lever into the notch of said scale circle.

* * * * *